United States Patent
Kistler

(10) Patent No.: US 8,782,564 B2
(45) Date of Patent: Jul. 15, 2014

(54) METHOD FOR COLLABORATIVE DISPLAY OF GEOGRAPHIC DATA

(75) Inventor: Peter Cornelius Kistler, Thornton, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 703 days.

(21) Appl. No.: 12/053,367

(22) Filed: Mar. 21, 2008

(65) Prior Publication Data

US 2009/0241029 A1    Sep. 24, 2009

(51) Int. Cl.
*G06F 3/048* (2013.01)

(52) U.S. Cl.
USPC ............ 715/848; 715/798; 715/748; 715/211

(58) Field of Classification Search
USPC .................................. 715/848, 798, 748, 211
See application file for complete search history.

(56) References Cited

U.S. PATENT DOCUMENTS

| | | | |
|---|---|---|---|
| 4,625,329 A | 11/1986 | Ishikawa et al. | |
| 7,562,289 B2 * | 7/2009 | Bufkin et al. | 715/211 |
| 7,836,085 B2 * | 11/2010 | Petakov et al. | 707/793 |
| 8,131,118 B1 | 3/2012 | Jing et al. | |
| 2002/0111810 A1 | 8/2002 | Khan et al. | |
| 2003/0169903 A1 | 9/2003 | Yoshikawa et al. | |
| 2004/0260720 A1 | 12/2004 | Cossins et al. | |
| 2007/0249368 A1 | 10/2007 | Bailly et al. | |
| 2007/0294305 A1 | 12/2007 | Cohen et al. | |
| 2008/0016472 A1 * | 1/2008 | Rohlf et al. | 715/848 |
| 2008/0052638 A1 | 2/2008 | Frank et al. | |
| 2008/0059889 A1 * | 3/2008 | Parker et al. | 715/748 |
| 2008/0077597 A1 | 3/2008 | Butler | |
| 2008/0133697 A1 | 6/2008 | Stewart et al. | |
| 2008/0170755 A1 | 7/2008 | Nasser et al. | |
| 2009/0089015 A1 | 4/2009 | Bell et al. | |
| 2009/0100031 A1 | 4/2009 | Gilligan et al. | |
| 2009/0153492 A1 | 6/2009 | Popp | |

* cited by examiner

*Primary Examiner* — Michael Roswell

(57) ABSTRACT

Embodiments of the present invention recite a method for collaborative display of geographic data. In one embodiment, a configuration file is created which defines how geographic data collected by a geographic data collection device is to be displayed by an office application. The configuration file is used to create a geographic data file in which collected geographic data is formatted to visually convey information about a geographic feature. The office application then accesses the geographic data file and automatically displays the geographic feature in a manner which is consistent with the configuration file.

25 Claims, 13 Drawing Sheets

400

START

CREATING A CONFIGURATION FILE WHICH DEFINES HOW GEOGRAPHIC DATA COLLECTED BY A GEOGRAPHIC DATA COLLECTION DEVICE IS TO BE DISPLAYED BY AN OFFICE APPLICATION
410

USING THE CONFIGURATION FILE TO CREATE A GEOGRAPHIC DATA FILE IN WHICH COLLECTED GEOGRAPHIC DATA IS FORMATTED TO VISUALLY CONVEY A GEOGRAPHIC FEATURE
420

ACCESSING THE GEOGRAPHIC DATA FILE AND AUTOMATICALLY DISPLAYING THE GEOGRAPHIC FEATURE IN A MANNER CONSISTENT WITH THE CONFIGURATION FILE
430

END

FIG. 4

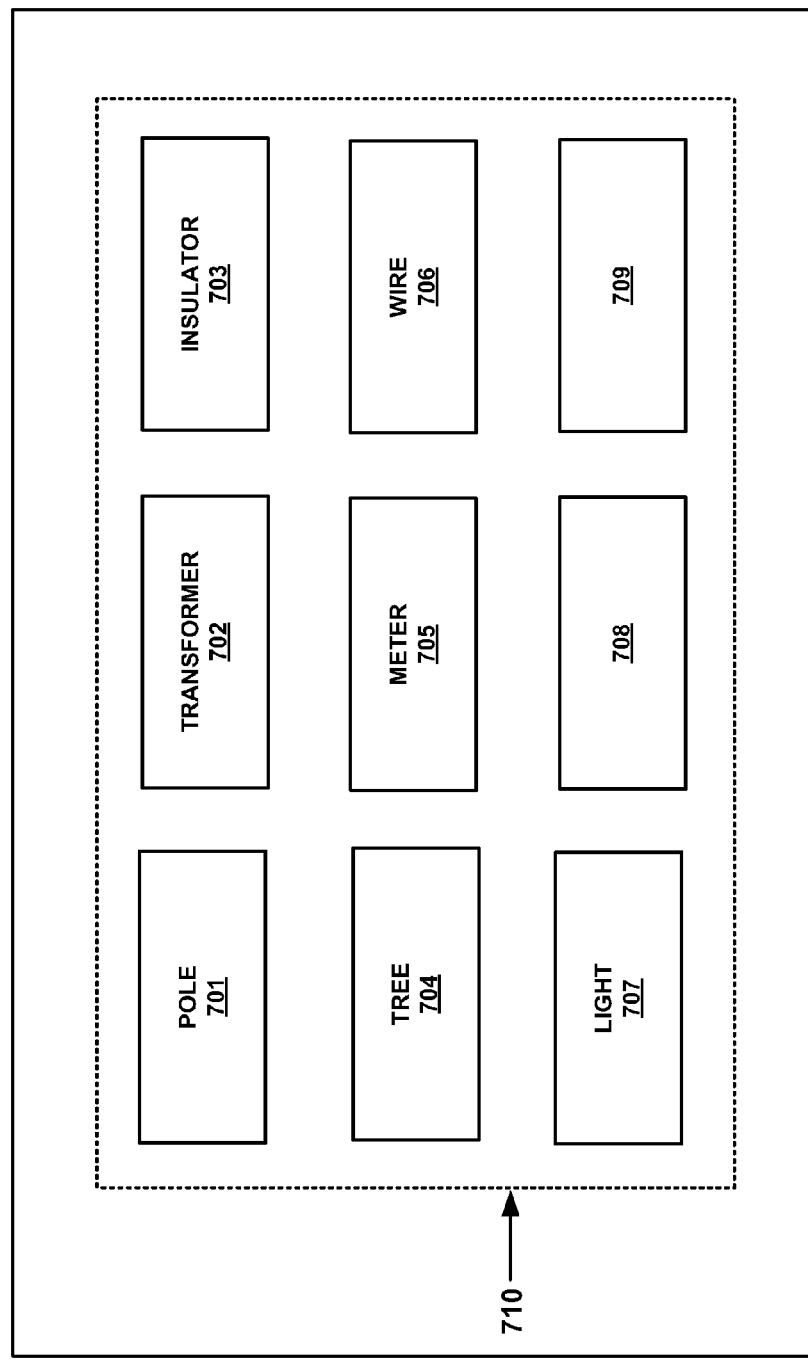

1100

START

AUTOMATICALLY IDENTIFYING AN ATTRIBUTE OF A GEOGRAPHIC FEATURE WHICH IS DESCRIBED IN AT LEAST ONE MEDIA FILE
1110

ACCESSING A CONFIGURATION FILE, WHICH DEFINES HOW THE ATTRIBUTE IS TO BE DISPLAYED, BY AN OFFICE APPLICATION
1120

DISPLAYING THE ATTRIBUTE IN A MANNER CONSISTENT WITH THE CONFIGURATION FILE
1130

END

FIG. 11

METHOD FOR COLLABORATIVE DISPLAY OF GEOGRAPHIC DATA

FIELD OF THE INVENTION

Embodiments of the present invention are related to geographic data systems.

BACKGROUND OF THE INVENTION

The collection and processing of geographic data often involves a geographic data collector in the field which collects data about a geographic feature. The geographic features may define a point (e.g., a tree, utility pole, fire hydrant, etc), a line (e.g., a road, stream, hedge, pipeline, etc), or a polygon (e.g., a parking lot, playground, housing lot, farm field, etc.). The attributes of a feature are descriptive information which further defines the object. For example, if the feature is a tree, attributes may include the species of tree (e.g., oak, maple, pine, etc.), the height, girth, location, condition (e.g., healthy, dead, overturned, etc.) of the tree.

A structured collection of geographic features and their corresponding attributes is typically stored in a feature library. The feature library is uploaded onto a geographic data collection device and is used to collect geographic data. As an example, if geographic data about a park is to be collected, a feature library may include features such as trees, park benches, parking lots, playground and/or playing fields, light poles, sidewalks and/or paths, roads, and other facilities such as rest rooms, etc. Alternatively, if geographic data is being collected for a utility company, the feature library may include features such as light poles, fire hydrants, water and sewage lines, meters, transformers, etc. Thus, a different feature library can be uploaded depending upon what type of data is to be collected.

In the field, when data is collected about a geographic feature, the location of the feature is recorded along with a code which indicates what type of geographic feature is being recorded. Typically, the surveyor accesses an ASCII file which contains a list of the codes. Typically, ASCII codes are used to minimize the use of computing resources of the geographic data collection device such as memory and/or data storage. This is problematic in that there is no standardized set of codes for geographic features. Therefore, the surveyor needs to know all of the codes within his/her organization. This can be a problem because different working groups may designate different codes for the same geographic feature. As a result, it can be difficult for the surveyor to memorize all of the codes needed to collect the desired data. Alternatively, the surveyor may carry a paper upon which all of the codes are listed, or the geographic data collection application may generate a user interface in which the codes are displayed.

Another problem with the collection and processing of geographic data is that the software applications operating on the geographic data collector and the office application used to process the geographic data are often developed as stand-alone applications. In other words, they are not designed or intended to work together. As a result, the geographic data files generated by a geographic data collection application are typically not formatted to be compatible with the office application used to subsequently process the collected data.

When the geographic data file is accessed by the office application, the office application displays the collected data. As an example, the office application can automatically draw line segments between points of a linear feature, or of a polygon feature. However, there are no additional features associated with the points and lines rendered by the office application. In other words, the attributes associated with a geographic feature are not automatically displayed.

This is especially problematic when a person in the office is not familiar with the site from which the feature/attribute data has been collected. For example, an office technician will see the points and lines displayed by the office application, but may have a hard time interpreting what they mean unless the office technician is familiar with the site. In other words, some prior knowledge of the site is needed in order for the office technician to interpret the collected data. Thus, additional effort is needed for the surveyor in the field to clearly communicate the meaning of the points and lines which are being displayed to the office technician. Alternatively, the office technician can manually look up the ASCII codes which are associated with respective geographic features and manually add that information to the displayed data. As a result, creating a descriptive interpretation of the collected geographic data can be more time consuming, expensive and error prone because the data collection and data rendering applications do not exchange all of the collected data in an efficient manner.

SUMMARY OF THE INVENTION

Embodiments of the present invention recite a method for collaborative display of geographic data. In one embodiment, a configuration file is created which defines how geographic data collected by a geographic data collection device is to be displayed by an office application. The configuration file is used to create a geographic data file in which collected geographic data is formatted to visually convey information about a geographic feature. The office application then accesses the geographic data file and automatically displays the geographic feature in a manner which is consistent with the configuration file.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 4 is a flowchart of a method for collaborative display of geographic data in accordance with embodiments of the present invention.

FIG. 7 is a block diagram of an exemplary geographic data collector graphical user interface in accordance with embodiments of the present invention.

FIG. 11 is a flowchart of a method 1100 for extracting attribute data from a multimedia file in accordance with an embodiment of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating," "using," "receiving," "appending," "generating," "storing," "displaying," "accessing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
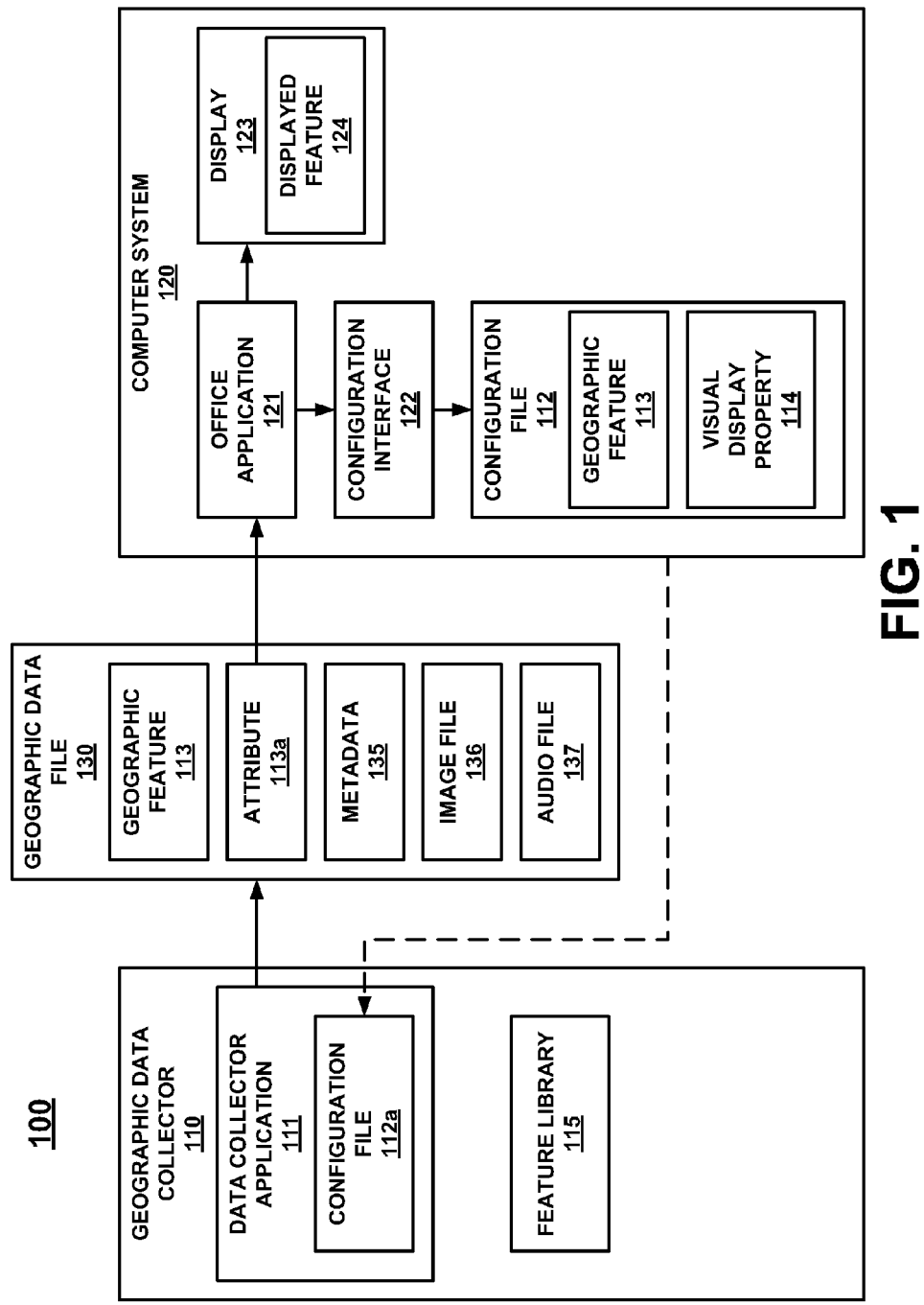
FIG. 1 is a block diagram of a system for collaborative display of geographic data in accordance with embodiments of the present invention.

FIG. 1 is a block diagram of a system 100 for collaborative display of geographic data in accordance with embodiments of the present invention. In FIG. 1, system 100 comprises a geographic data collector 110 and a computer system 120. In one embodiment, geographic data collector 110 and computer system 120 are communicatively coupled via a communication network (not shown). The communication network can comprise a wired or wireless communication network in embodiments of the present invention. Alternatively, a removable data storage medium such as a U.S.B. flash memory drive, or the like, can be used to transfer data between geographic data collector 110 and computer system 120.

In FIG. 1, geographic data collector 110 comprises a data collector application 111 for collecting and managing geographic data. In one embodiment, this may comprise recording geographic position data about a geographic feature as well as corresponding attribute data. Furthermore, data collector application 111 is for creating a geographic data file (e.g., 130) for conveying collected geographic data to an office application (e.g., office application 121). Data collector application 111 further comprises a configuration file 112a which is described in greater detail below. In FIG. 1, geographic data collector 110 further comprises a feature library 115 comprising at least one geographic feature and at least one attribute corresponding to that geographic feature. In embodiments of the present invention, data collector application 111 accesses the geographic features and attributes of feature library 115 in order to create geographic data file 130.

System 100 further comprises a computer system 120. In FIG. 1, computer system 120 implements an office application 121 which is for accessing geographic data collected by geographic data collector 110 (e.g., via geographic data file 130) and for further processing of that data. In one embodiment, office application 121 can create and display (e.g., 123) a visual representation of an area based upon geographic data collected by geographic data collector 110. Additionally, office application 121 can store or generate an electronic file or a map based upon that visual representation.

Additionally, office application 121 is also for generating a configuration interface 122 which is used to create a configuration file 112. In one embodiment, configuration interface 122 receives an indication of a geographic feature 113 (e.g., an attribute of feature library 115) and an indication of a visual display property 114 which corresponds to the attribute.

In embodiments of the present invention, a visual display property is a parameter for displaying an object upon display 123 of computer system 120. In embodiments of the present invention, a visual display property of an object may comprise, but is not limited to, a symbol or graphic character, a selected color (e.g., either for the symbol or for font describing the feature), a selected font, a selected font style (e.g., normal, italic, bold, all caps, etc). A visual display property may also comprise a selected line style (e.g., solid line, dashed line, dotted line, or a combination thereof), a line color, a combination of font and line style, etc. Other visual display properties could depict the area and volume descriptors of an object, possibilities include a hatch pattern, fill color or gradient or a texture image. It is appreciated that the visual display properties listed above are representative of a variety of visual display properties and are not intended to limit the present invention solely to those listed above. Furthermore, combinations of the above listed visual display properties may be used embodiments of the present invention.

In one embodiment, each geographic feature (e.g., 113), or an attribute thereof, is associated with a unique visual display property 114. This facilitates identifying the geographic feature and its attributes using office application 121 without prior knowledge of the site from which geographic data has been collected because the visual display properties of a displayed feature (e.g., 124) convey information about the corresponding geographic feature. For example, a user of office application 120 can create configuration file 112 which is then conveyed to geographic data collector 110 and stored as configuration file 112a of data collector application 111. In one embodiment, the user of office application 121 selects one or more visual display properties (e.g., 114) using configuration interface 122. The user then associates the selected visual display properties with a selected geographic feature (e.g., 113) or an attribute of that geographic feature.

Upon associating the desired visual display attributes with corresponding geographic features and their attributes, configuration file 112 is saved. Configuration file 112 is then conveyed to geographic data collector 110 using, for example, a wired or wireless communication network, or using a removable memory device such as a U.B. flash memory device, where it is stored as configuration file 112a. Data collector application 111 uses configuration file 112a to create and format geographic data file 130. Geographic data file 130 comprises the geographic position data of a geographic feature (e.g., 113) and may also comprise one or more attributes (e.g., 113a) corresponding to geographic feature 113. In embodiments of the present invention, configuration file 112a causes data collector application 111 to append metadata 135 to geographic feature 113 which describes that visual display property 114 associated with geographic feature 113. In one embodiment, configuration file 112a causes geographic data collector application to directly append a selected visual display property 114 with a selected geographic feature 113 or one of its attributes 113a. For example, a selected attribute 113a may be appended with XML tags which convey the visual display property (e.g., 114) which is associated with attribute 113a. Geographic data file 130 may also comprise an image file 136 comprising one or more captured images of geographic feature 113. Alternatively, image file 136 may comprise a video clip of geographic feature 113. In another embodiment, geographic data file 130 comprises an audio file 137 in which the field user stores a verbal description of geographic feature 113. The processing of the audio description of the feature can either be done by the office technician or automatically using voice recognition techniques. Thus, office application 121 can use a voice recognition component (e.g., 830 of FIG. 8) to automatically extract information about a geographic feature, and attributes thereof, based upon processing of an audio file in one embodiment. For example, a user of geographic data collector 110 can collect the geographic position of a feature using position determining component 220 and use audio capture device 250 to record a vocal description of the feature and/or attributes of that feature. Thus, geographic data file 130 may comprise data from a plurality of sources which are used to describe a geographic feature and/or attributes thereof.

In one embodiment, geographic data file 130 is compatible with the Feature XML-based Languages (FXL) format. FXL utilizes XML based language representations to create specific language converters for applications. Using FXL, domain specific languages, software, and service oriented architectures can be generated.

In one embodiment, geographic data collector 110 then conveys geographic data file 130 to computer system 120 via a wired or wireless communication network. Office application 121 accesses geographic data file 130 and uses the metadata 135 to create display 123. More specifically, displayed feature 124 is rendered upon display 123 in a manner consistent with the visual display property 114 associated with geographic feature 113.

As an example, configuration file 112a may associate a gravel road with a visual display property 114 such that a gravel road is displayed as a blue dashed line by office application 121. Thus, when office application 121 accesses geographic data file 130, it will render geographic feature 113 upon display 123 (e.g., displayed feature 124) as a blue dashed line upon display 123. Alternatively, configuration file 112a may associate a dirt path with a brown line which also comprises the text "path." When office application 121 accesses geographic data file 130, it will render geographic feature 113 upon display 123 (e.g., displayed feature 124) as a brown line which also comprises the text "path." In another embodiment, a particular symbol can be associated with a geographic feature or an attribute thereof. For example, configuration file 112a may associate a particular symbol with a tree. When office application 121 accesses geographic data file 130, it will render geographic feature 113 (e.g., displayed feature 124) using that particular symbol. Additionally, configuration file 112a may associate a particular color with the tree symbol based upon an attribute (e.g., species) of the tree. Thus, office application may render a blue tree symbol if geographic feature 113 is an oak tree and render a green tree symbol if geographic feature 113 is a maple tree. In other words, information about a geographic feature and/or its attributes is conveyed based upon the visual display properties associated with the geographic feature and/or attribute.

Embodiments of the present invention are advantageous in that the user of office application 121 can define how attributes of geographic features are rendered by office application 121 in a manner that is consistent with the users in the field. Additionally, because configuration file 112a causes data collector application 111 to append metadata to selected attributes, office application 121 can render geographic features in an intuitive manner which visually conveys information to the user of office application 121. Furthermore, because the visual display properties are selected by the user of office application 121, the meaning of the displayed visual properties is more readily understood by the user of office application 121. Additionally, the displayed feature 124 is rendered automatically by office application 121 directly from geographic data file 130. As a result, the user of office application 121 does not have to manually access the coding associated with a geographic feature, determine which attributes that coding associates with the geographic feature, and manually configure the displayed data. Thus, embodiments of the present invention facilitate collaborative display of geographic data in a manner which is less time consuming and less prone to human error than some conventional methods.

Figure 2:
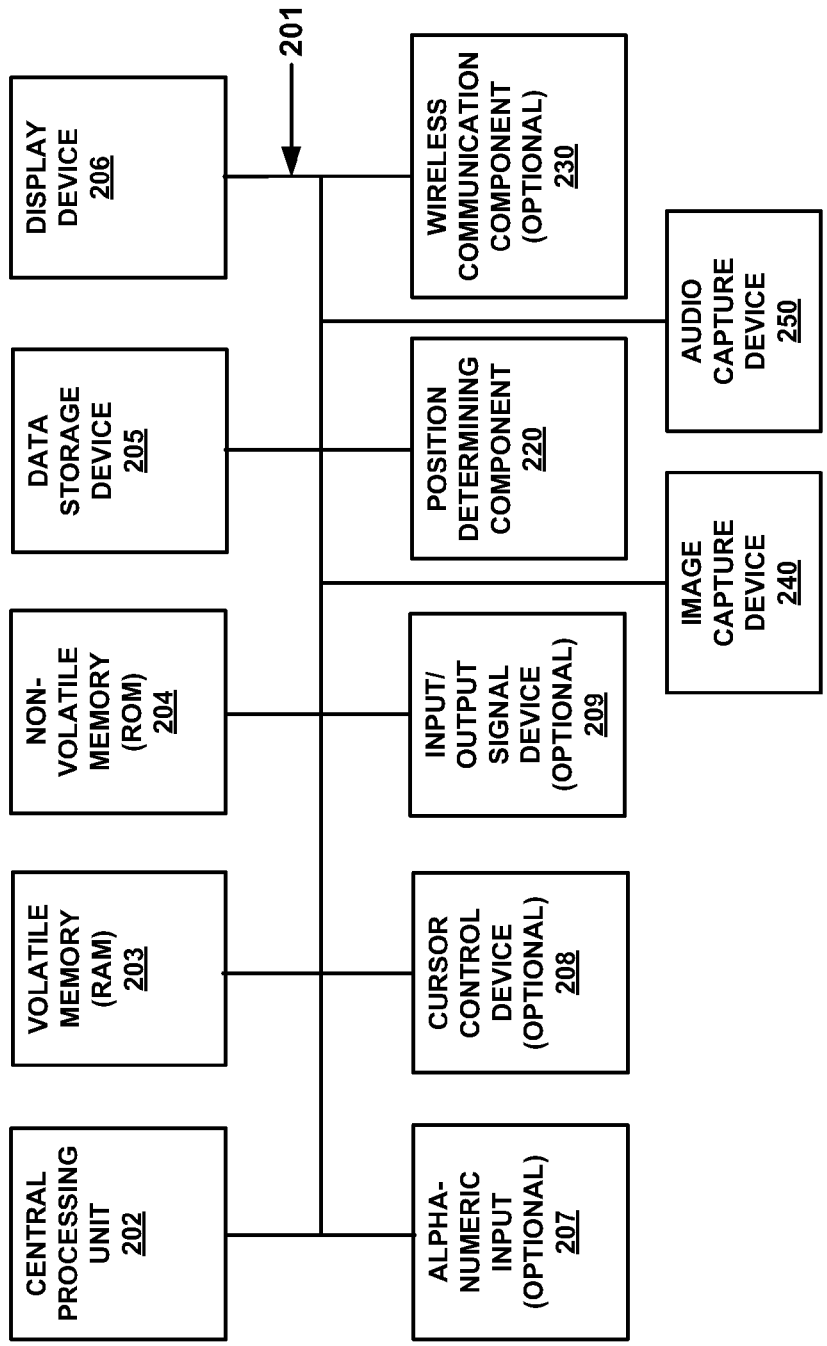
FIG. 2 is a block diagram of a geographic data collector in accordance with embodiments of the present invention.

FIG. 2 is a block diagram of a geographic data collector 110 in accordance with embodiments of the present invention. In one embodiment, geographic data collector 110 comprises an address/data bus 201 for conveying digital information between the various components, a central processor unit (CPU) 202 for processing the digital information and instructions, a volatile main memory 203 comprised of volatile random access memory (RAM) for storing the digital information and instructions, and a non-volatile read only memory (ROM) 204 for storing information and instructions of a more permanent nature. In addition, geographic data collector 110 may also include a data storage device 205 (e.g., a magnetic, optical, floppy, or tape drive or the like) for storing vast amounts of data. In one embodiment of the present invention, data storage device 205 may comprises a removable data storage device.

Additional devices comprising geographic data collector 110 may include a display device 206 for displaying information to a user, an optional alpha-numeric input device 207, and an optional cursor control device 208 (e.g., mouse, trackball, light pen, etc.) for inputting data, updates, etc. Geographic data collector 110 can also include a mechanism for emitting an audible signal (not shown).

Returning still to FIG. 2, display device 206 of FIG. 2 may be a liquid crystal device, field emission device (FED) organic light emitting diode (OLED), or other display device suitable for crating graphic images and alphanumeric character recognizable to a user. In one embodiment, display device 206 is a flat panel multi-mode display capable of both monochrome and color display modes. In one embodiment of the present invention, display device 206 comprises a touch-screen assembly such as a flat panel resistive touch screen assembly. The touch screen assembly can communicate information (spatial data) and command selections to the central processor unit 202 and is further capable of registering a position on the display device 206 where contact is made between resistive a digitizer film and a digitizing element of the touchscreen assembly. Cursor control device 208 allows the computer user to dynamically signal the two dimensional movement of a visible symbol (cursor) on a display screen of display device 206. It is be appreciated that a cursor can be directed and/or activated via input from alpha-numeric input 207 using special keys and key sequence commands. Accordingly, in embodiments of the present invention, geographic data collector 110 may not utilize alpha-numeric input device 207 or cursor control device 208 for user input due to the use of the touchscreen assembly.

Furthermore, geographic data collector 110 can include an input/output (I/O) signal device (e.g., interface) 209 for interfacing with a communication network.

As described above, geographic data collector 110 is operable for collecting geographic position data of an object. Accordingly, position determining component 220 is for determining the geographic position of geographic data collector 110. In embodiments of the present invention, position determining component 220 comprises a GNSS antenna and a GNSS receiver. GNSS includes satellite positioning systems such as the Global Positioning System (GPS), the Glonass system, and the Galileo system. However, while the present embodiment specifically recites a GNSS position determining component, embodiments of the present invention are well suited to utilize a variety of terrestrial-based and satellite-based position determining components as well. For example, one embodiment of the technology can utilize any of the following satellite navigations systems as well: the Wide Area Augmentation System (WAAS), the European Geostationary Navigation Overlay Service (EGNOS), the Quasi-zenith Satellite System (QZSS), the Compass navigation system (also referred to as the Beidou-2 navigation system), and the Indian Regional Navigational Satellite System (IRNSS). In embodiments of the present invention, the geographic position determined by position determining component 220 describes the latitude and longitude of geographic data collector 110. However, position determining component 220 may also determine the elevation of geographic data collector 110 in embodiments of the present invention. Alternatively, geographic data collector 110 may describe its geographic position using a grid, or reference, system in which coordinates are typically referred to as "X, Y, and Z" or "Northing," "Easting," and "Elevation."

An optional wireless communications component 230, comprising a wireless modem and a wireless antenna, is also coupled with bus 201. Wireless communications component 230 is for transmitting and receiving wireless messages (e.g., data and/or commands). In one embodiment, wireless communications component can receive configuration file 112 and/or transmit geographic data file 130. In embodiments of the present invention, wireless communication component 230 is compliant with the Global System for Mobile Communications (GSM) specification. While the present invention recites a GSM compliant wireless communication device, other wireless communication specifications, such as the Global Packet Radio Service (GPRS) specification, may be utilized in embodiments of the present invention. In one embodiment, geographic data collector 110 sends and receives messages using the Short Message Service (SMS). However, the present invention is well suited to utilize other message formats as well.

In other embodiments of the present invention, wireless communication component 230 may comprise a Bluetooth wireless communications device, or another wireless communications device such as a Wi-Fi transceiver. Wi-Fi transceivers are often used to create local area networks between a computer and an Internet access point in public areas such as airports, coffee shops, libraries, and the like. Alternatively, many cellular telephone providers also provide wireless Internet services using communication devices known as "air cards" which refer to wireless communication devices which allow electronic devices to pick up wireless radio signals in a manner similar to a cellular telephone. One type of air card couples with a PCMCIA Type 2 card slot disposed within, for example, geographic data collector 110, and facilitates establishing a wireless Internet connection when installed. Thus, in one embodiment, wireless communication component 230 comprises an air card.

In one embodiment, geographic data collector 110 further comprises an optional image capture device 240. In one embodiment, image capture device 240 is for capturing a digital image of a geographic feature. In one embodiment, image capture device 240 is configured for capturing a still image of a geographic feature. In another embodiment, image capture device 240 is configured for recording a video clip of a geographic feature.

In one embodiment, geographic data collector 110 further comprises an optional audio capture device 250. In one embodiment, audio capture device 250 is for recording audio information which may be used to capture data about a geographic feature and/or attributes thereof. As described above, in one embodiment, a user of geographic data collector 110 can collect the geographic position of a feature using position determining component 220 and use audio capture device 250 to record a vocal description of the feature and/or attributes of that feature. However, embodiments of the present invention are not limited to verbal descriptions of a geographic feature, or attributes thereof, alone. For example, geographic feature 113 may comprise a malfunctioning piece of equipment which is producing a distinctive sound. In one embodiment, geographic data collector 110 can record that sound so that analysis of the malfunctioning equipment may be made later. Thus, a history of that piece of equipment may include audio files which indicate operating states of a geographic feature, or an attribute of that feature.

Figure 3:
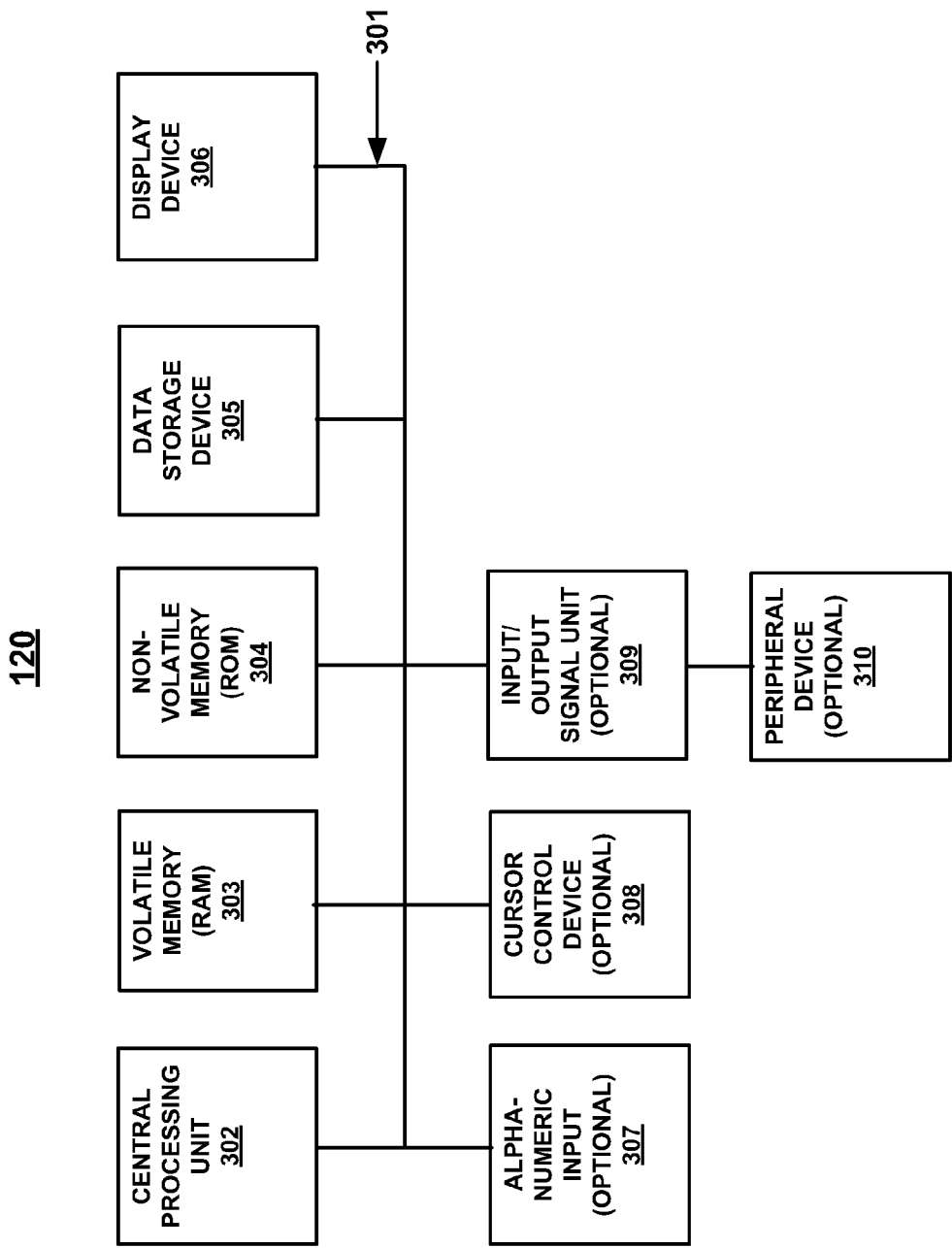
FIG. 3 is a block diagram of a computer system upon which a method for collaborative display of geographic data may be implemented in accordance with the present invention.

FIG. 3 is a block diagram of a computer system 120 upon which a method for collaborative display of geographic data may be implemented in accordance with the present invention. With reference to FIG. 3, portions of the present invention are comprised of computer-readable and computer-executable instructions that reside, for example, in computer system 120 which is used as a part of a general purpose computer network (not shown). It is appreciated that computer system 120 of FIG. 3 is exemplary only and that the present invention can operate within a number of different computer systems including general-purpose computer systems, embedded computer systems, laptop computer systems, hand-held computer systems, and stand-alone computer systems.

In the present embodiment, computer system 120 includes an address/data bus 301 for conveying digital information between the various components, a central processor unit (CPU) 302 for processing the digital information and instructions, a volatile main memory 303 typically comprised of volatile random access memory (RAM) for storing the digital information and instructions, and a non-volatile read only memory (ROM) 304 for storing information and instructions of a more permanent nature. In addition, computer system 120 may also include a data storage device 305 (e.g., a magnetic, optical, floppy, or tape drive or the like) for storing vast amounts of data. It should be noted that the software program for collaboratively displaying geographic data of the present invention can be stored either in volatile memory 303, data storage device 305, or in an external storage device (not shown).

Additional devices comprising computer system 120 include a display device 306 for displaying information to a user, an optional alpha-numeric input device 307, and an optional cursor control device 308 (e.g., mouse, trackball, light pen, etc.) for inputting data, updates, a voice recognition system, an image processing component, etc. Computer system 120 can also include a mechanism for emitting an audible signal (not shown).

Furthermore, computer system 120 can include an input/output (I/O) signal unit (e.g., interface) 309 for interfacing with a peripheral device 310 (e.g., a computer network, modem, mass storage device, geographic data collector 110, etc.). Accordingly, computer system 120 may be coupled in a network, such as a client/server environment, whereby a number of clients (e.g., personal computers, workstations, portable computers, minicomputers, terminals, etc.) are used to run processes for performing desired tasks. It is appreciated that office application may be resident in volatile main memory 303, data storage device 305, or may be accessed from a computer network via interface 309.

FIG. 4 is a flowchart of a method 400 for collaborative display of geographic data in accordance with embodiments of the present invention. In operation 410 of FIG. 4, a configuration file is created which defines how geographic data collected by a geographic data collection device is to be displayed by an office application. As described above, configuration file 112 is created by configuration interface 122 and associates a visual display property 114 with a corresponding geographic feature 113, or an attribute of geographic feature 113.

In operation 420 of FIG. 4, the configuration file is used to create a geographic data file in which collected geographic data is formatted to visually convey information about a geographic feature. As described above with reference to FIG. 1, data collector application 111 uses configuration file 112a which is stored upon geographic data collector 110 to create geographic data file 130. In one embodiment, configuration file 112a causes data collector application 111 to associate metadata 135 with geographic feature 113 within geographic data file 130. In another embodiment, configuration file 112a causes data collector application 111 to associate attribute 113a with metadata 135. In embodiments of the present invention, metadata 135 is used to convey how to render information about geographic feature 113 and/or attribute 113a to office application 121.

In operation 430 of FIG. 4, the office application accesses the geographic data file and automatically displays the geographic feature in a manner consistent with the configuration file. As described above with reference to FIG. 1, office application 121 accesses geographic data file 130 in order to render the data collected by geographic data collector 110. More specifically, office application displays geographic feature 113 or attribute 113a, in accordance with the visual display property (e.g., 114) as defined by metadata 135. Additionally, the displayed feature is rendered automatically by office application 121 directly from geographic data file 130.

Figure 5:
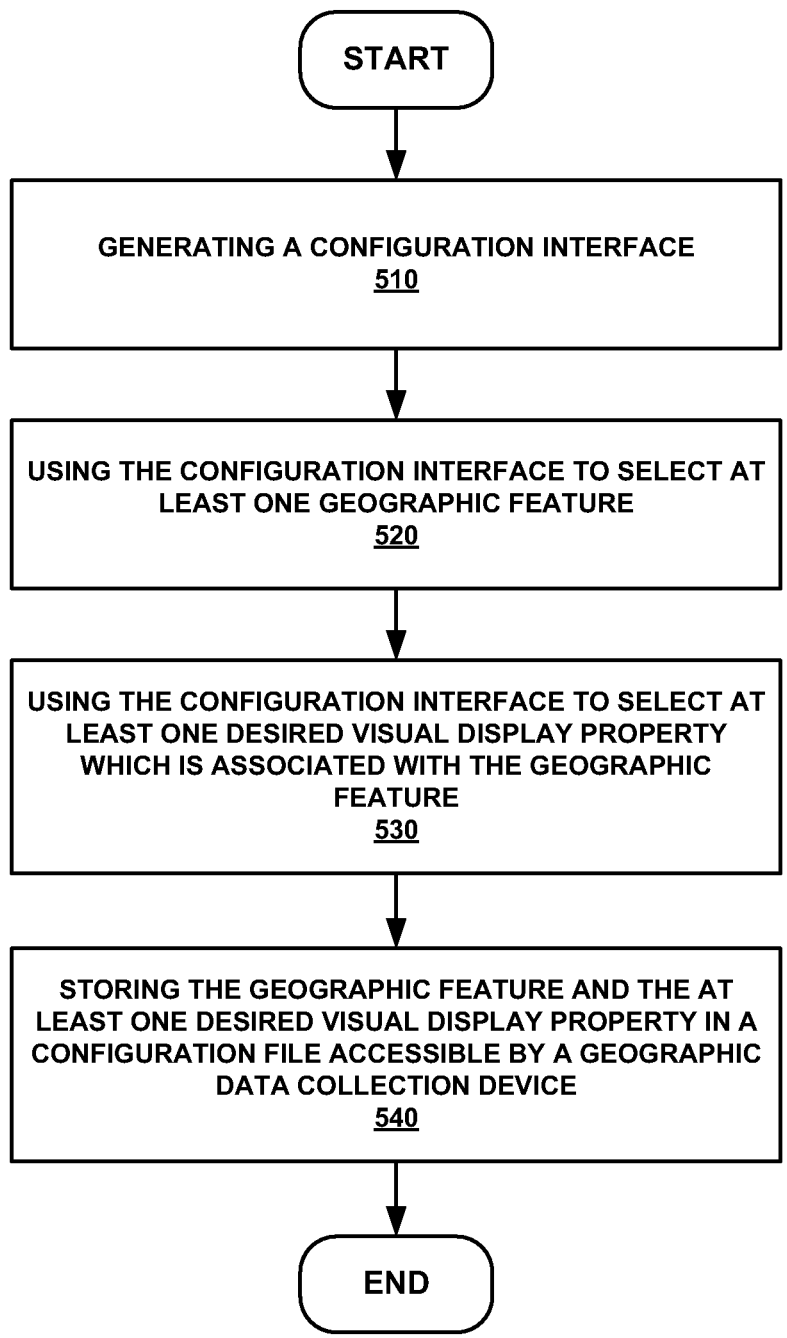
FIG. 5 is a flowchart of a method for collaborative display of geographic data in accordance with embodiments of the present invention.

FIG. 5 is a flowchart of a method 500 for collaborative display of geographic data in accordance with embodiments of the present invention. In operation 510 of FIG. 5, a configuration interface is generated. As described above, office application 121 generates a configuration interface 122 which is used to create configuration file 112.

In operation 520 of FIG. 5, the configuration interface is used to select at least one geographic feature. As will be described in greater detail below, configuration interface 122 is used to select a geographic feature and/or a corresponding attribute(s) which are to be included in configuration file 112.

In operation 530 of FIG. 5, the configuration interface is used to select at least one desired visual display property which is associated with the geographic feature. As will be described in greater detail below, configuration interface 122 is further for selecting one or more visual display properties which are to be associated with the geographic feature and/or attribute identified above in operation 520.

In operation 540 of FIG. 5, the geographic feature and corresponding at least one visual display property are stored in a configuration file accessible by a geographic data collection device. The geographic feature, and/or attribute, as well as the selected visual display property are stored in configuration file 112 for use by geographic data collector 110 in creating geographic data file 130.

Figure 6A:
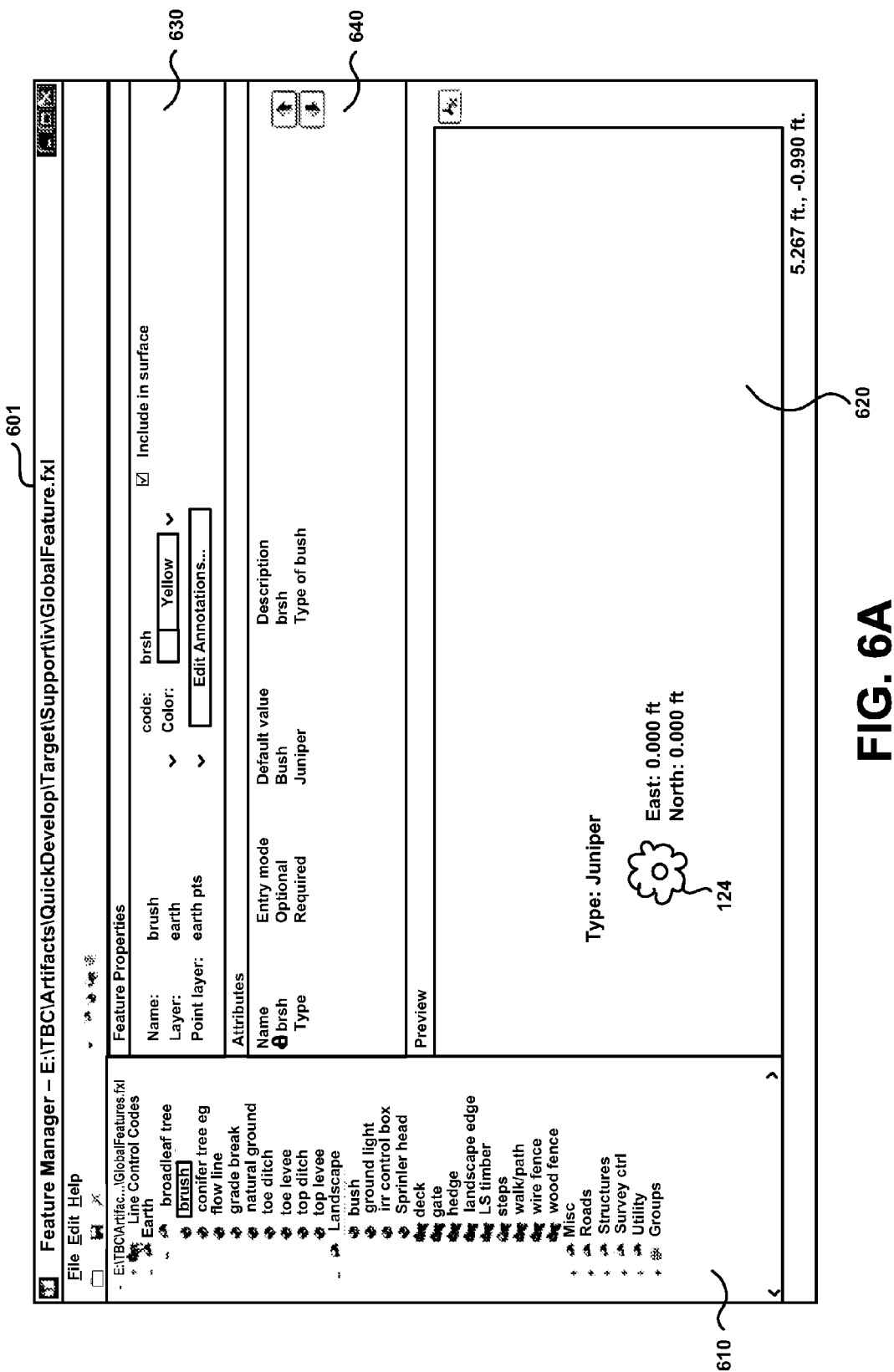
FIGS. 6A, 6B, and 6C are exemplary screen shots of a configuration interface in accordance with embodiments of the present invention.
Figure 6B:
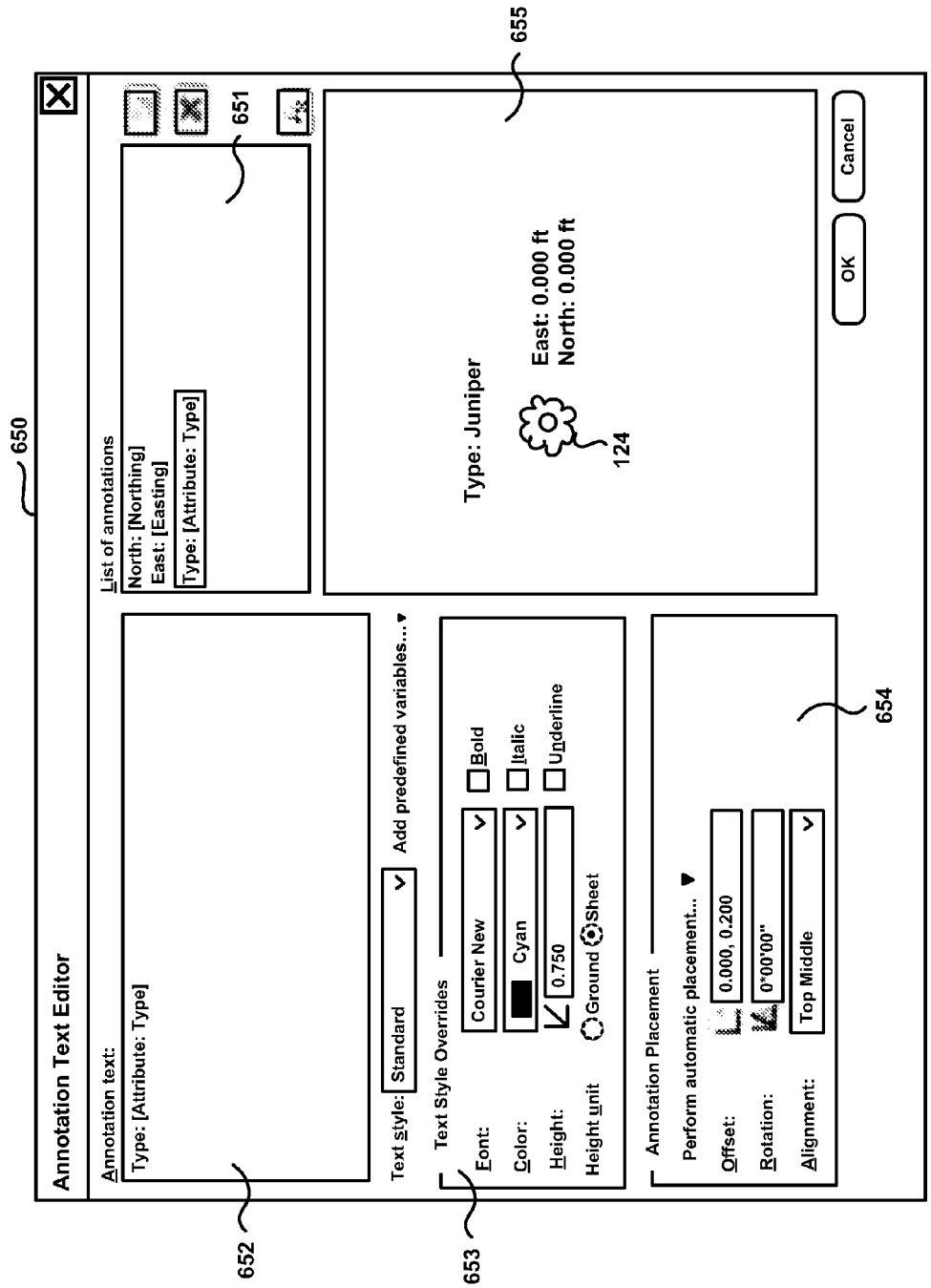
Figure 6C:
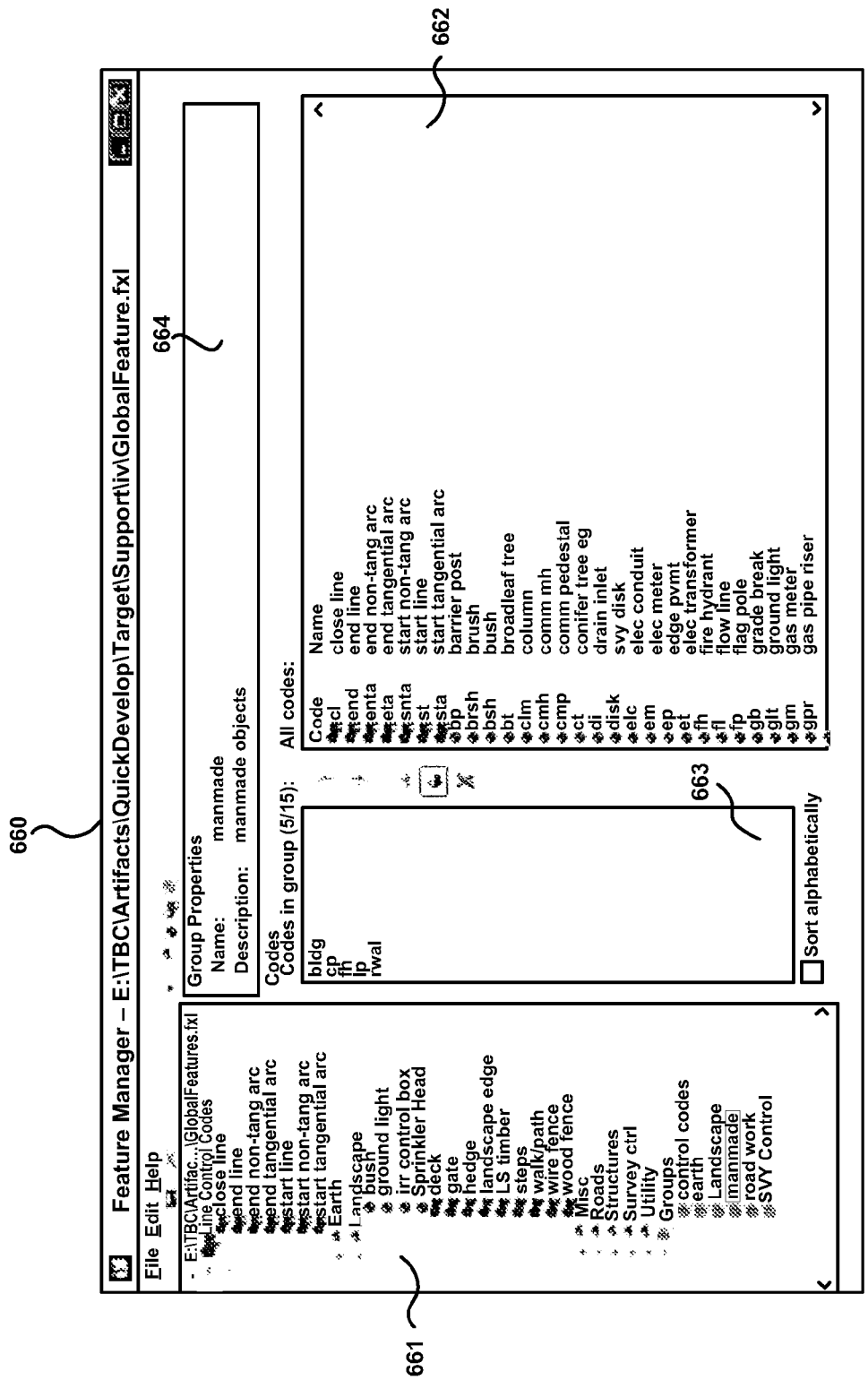

FIGS. 6A, 6B, and 6C are exemplary screen shots of a configuration interface 122 in accordance with embodiments of the present invention. With reference to FIG. 6A, configuration interface 122 displays graphical user interface (GUI) 601. In one embodiment, GUI 601 is used to create and modify configuration file 112. On the left side of GUI 601 is a tree control region 610 which comprises categories of features (e.g., 113). In FIG. 6A, the categories of tree control region 610 are: Earth, Landscape, Miscellaneous, Roads, Structures, Survey Ctrl, Utility, and Groups. By grouping the features in categories, it is easier for a user of office application 121, to find and select the proper coding for a point rather than having to memorize codes for various features. Within control region 610, the feature type "brush" has been selected.

GUI 601 further comprises a preview region 620 which shows how a displayed feature 124 will be displayed within display 123 based upon the visual display properties 114 selected for a given geographic feature (e.g., 113 of FIG. 1) and/or attributes (e.g., 113a of FIG. 1) corresponding to geographic feature 113. As shown in FIG. 6A, displayed feature 124 comprises a symbol for brush which has been displayed at the position at which the brush is located, as well as a set of coordinates for the brush. This displayed feature 124 as well as the set of coordinates is extracted from geographic data file 130 by office application 121 and automatically displayed in embodiments of the present invention. However, embodiments of the technology are not limited to displaying symbols for a displayed feature. For example, a picture or thumbnail view of the feature (e.g., taken by image capture device 240) may be displayed within display 123. In another example, a three dimensional glyph of the feature may be displayed within display 123. Furthermore, the manner in which they are displayed by office application has been defined in geographic data file 130 based upon configuration file 112a. In contrast, many conventional office applications will only display a point with no other displayed information about what type of feature, or its attributes, is at that point. In one embodiment, preview region 620 may display a grid of lines which indicate latitude/longitude data, or a scale of distance (e.g., feet, yards, miles, meters, kilometers, etc.) as well.

GUI 601 further comprises a "Feature Properties" region 630 which is used to select the visual display properties 114 which are associated with a geographic feature 113 within configuration file 112. Within "Feature Properties" region 630, the geographic feature is named (brush) as well as a corresponding alpha-numeric code (brsh). The alpha-numeric code is typically used to facilitate recording the feature type because data entry is sometimes difficult in field conditions. Alternatively, a drop-down box may be used to select the feature type.

Also within "Feature Properties" region 630 is a drop-down box for selecting the layer with which the geographic feature 113 is associated. A layer is a computer aided design (CAD) field which facilitates grouping information within office application 121. For example, a first layer within display 123 may show all of the trees within a survey region, while a second layer shows the location and alignment of roads and sidewalks within the survey region. Also within "Feature Properties" region 630 is a drop-down box for selecting a color of the geographic coordinates shown in preview region 620. In FIG. 6A, the color yellow has been selected for the geographic coordinates of the earth layer. Thus, within preview region 620, the geographic coordinates (e.g., East: 0.000 ft, and North: 0.000 ft) of the displayed brush will be yellow.

GUI 601 further comprises an "Attributes" region 640 which is used to define how attribute data is to be collected for a particular feature type. Within "Attributes" region 640, the code "brsh" is shown along with a default value indicating that the brush is an individual plant rather than a hedge. Below that, the attribute parameters indicate that it is required to enter what type of brush is being recorded and that the default value is a juniper plant. Thus, if a surveyor records a geographic feature type of "brsh", data collector application 111 will display a prompt for the surveyor to enter attribute data indicating what species is being recorded. As seen in preview region 620, the attribute "Juniper" has been displayed for that feature. It is noted that other attribute data for brush may be included within "Attributes" region 640 such as the height of the brush, the general condition of the brush (e.g., healthy, dead, etc.), or other attributes not shown.

With reference to FIG. 6B, configuration interface 122 displays graphical user interface (GUI) 650 which allows a user of office application 121 to define text parameters of data associated with a displayed feature 124. A "List of annotations" region 651 shows annotations which are to be displayed in display 123 and which are also shown in preview region 655. As shown in FIG. 6B, the annotations displayed are: "North," "East," and "Type." The data within the square brackets corresponds to metadata 135 from geographic data file 130 and indicates what metadata from geographic data file 130 is associated with a particular annotation displayed in region 651. GUI 650 further comprises a preview region 655 which shows how a displayed feature 124 will be displayed (e.g., displayed feature 124) within display 123 based upon the visual display properties 114 selected via GUI 650.

In embodiments of the present invention, office application 121 automatically extracts the information as defined in "List of annotations" region 651 and automatically displays that information in preview regions 620 and 655 of FIGS. 6A and 6B respectively. In contrast, many conventional office applications do not automatically display this information about a geographic feature. Instead, the user of a conventional office application has to look up the ASCII codes associated with a geographic feature, extract the desired information, and manually add that information to the display. Furthermore, a conventional office application is not able to support displaying a preview (e.g., preview region 620 of FIG. 6A and preview region 655 of FIG. 6B) because the necessary visual display properties are not associated with a corresponding geographic feature, or attribute thereof. In contrast, configuration interface 122 can use the configuration data to generate a preview (e.g., 620 and 655) of how a displayed geographic feature will be rendered prior to actually collecting data about that geographic feature.

On the left side of GUI 650 is an "Annotation text" region 652 for defining which annotation is currently being configured. In FIG. 6B, the "Type" annotation is being configured with visual display properties (e.g., 114). The phrase "[Attribute Type]" indicates that office application 121 will extract the name of the attribute type associated with geographic feature 113 from geographic data file 130 and that a user of geographic data collector 110 will be prompted to enter that attribute data when creating geographic data file 130. GUI 650 further comprises a "Text style" region 653 for defining what text style is associated with displayed feature 124. As shown in FIG. 6B, the text style for the Type annotation is standard using the Courier New font with a color of Cyan and a font height of 0.750 (inches) within display 123. The "Annotation placement" region 654 is for defining how the text describing the Type annotation is to be displayed. In FIG. 6B, the text describing the Type annotation has a Top Middle alignment with reference to where displayed feature 124 is rendered within display 123.

With reference to FIG. 6C, configuration interface 122 displays graphical user interface (GUI) 660, which is used to configure a GUI displayed by data collector application 111. With reference now to FIG. 7, in one embodiment data collector application 111 generates a GUI 700 in which a group 710 of text boxes are displayed upon a touch screen display. In the example of FIG. 7, a 3×3 array of text boxes is displayed. However, embodiments of the present invention are not limited to a 3×3 array alone. In one mode of operation, data collector application 111 displays group 710 and a user can select a particular feature type, or other operation, by selecting one of the text boxes. This can facilitate data entry for a user of geographic data collector 110 because the user can simply touch the desired text box to enter data rather than having to manually type a code, or select it from a drop-down box. In the example of FIG. 7, group 710 has been configured to collect data regarding utility poles and power lines. Thus, text box 701 is for selecting a pole, text box 702 is for selecting a transformer, and text box 703 is for selecting an insulator. Additionally, text box 704 is for selecting a tree, text box 705 is for selecting a meter, text box 706 is for selecting a wire, and text box 707 is for selecting a light. In the example of FIG. 7, text boxes 708 and 709 are unused. In one embodiment, rather than displaying the name of a feature, the corresponding control code is displayed in a text box. Thus, rather than displaying "pole" in text box 701, the control code "pl" may be displayed instead.

Returning to FIG. 6C, GUI 660 is used to select a tree control region 661 is displayed which is similar to the tree control region 610 described above with reference to FIG. 6A. As shown in FIG. 6C, the "Groups" category has been opened and the manmade group has been selected. Additionally, the "Line Control Codes" category and the "Landscape" category have been opened. As discussed above, a group is a selected set of features, or their corresponding control codes, which are displayed by GUI 700. A "Group Properties" region 664 shows the name of the selected group and a description of what types of objects are included in that group. The "All codes" region 662 is for displaying all of the codes from the categories (e.g., Landscape and Line Control Codes) which were opened in tree control region 661. As shown in the "Codes in group" region 663, there are currently 5 control codes selected (e.g., bldg, cp, fh, lp, and rwal) and that a total of 15 control codes can comprise the manmade group. A user of office application 121 can select an object from "All codes" region 662 and include that code in the "Codes in group" region 663. In embodiments of the present invention, when configuration file 112 is uploaded into geographic data collector 110, GUI 700 will display the codes shown in "Codes in group" region 663. Upon selecting one of the codes using GUI 700, the user will be prompted to collect additional information about that object. For example, if a user selects the tree text box (e.g., 705 of FIG. 7), the user may be prompted to enter data such as the size and type of tree and whether the tree is overhanging power lines and needs to be trimmed. In one embodiment, a plurality of control codes can be chained together. For example, if a tree is also part of a fence line, a control code for tree_fence may be created and included in a group.

Figure 8:
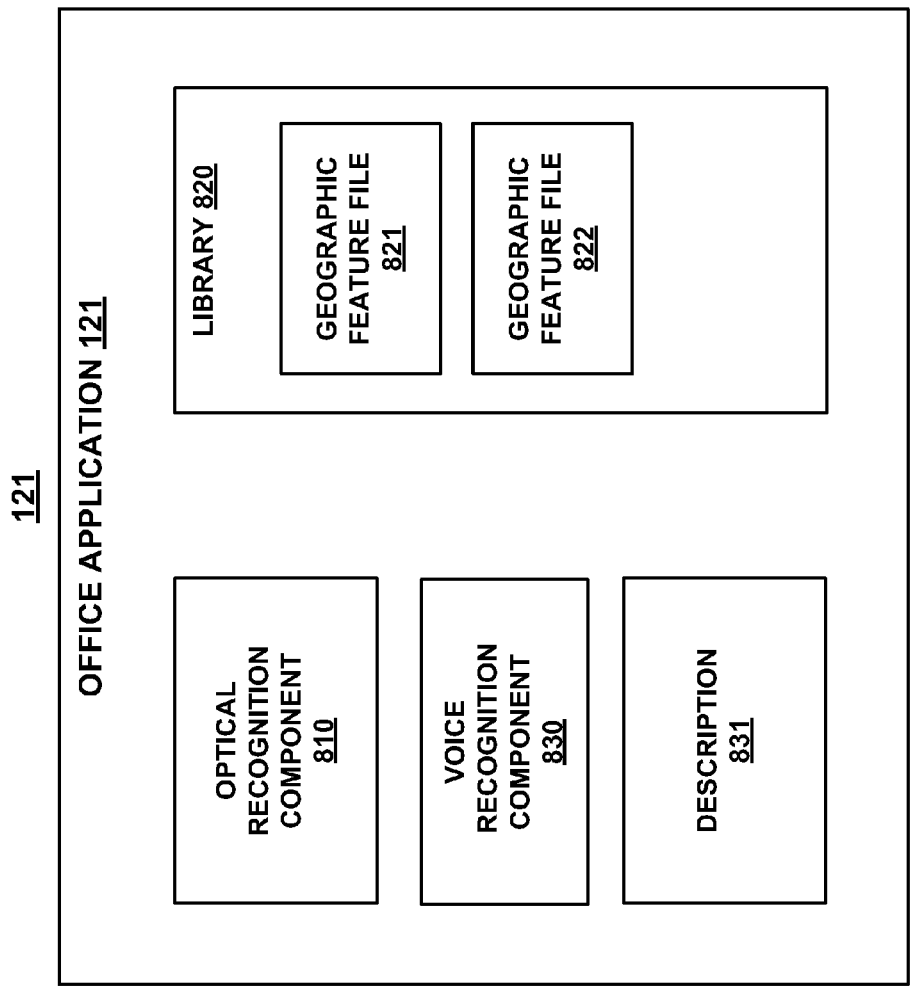
FIG. 8 is a block diagram of an office application for extracting attribute data based upon a captured image in accordance with one embodiment.

With reference to FIG. 8, in one embodiment, office application 121 comprises an optical recognition component 810 for identifying attributes about geographic features based upon one or more pictures, or a video, of the geographic feature. Optical recognition technology is used in a wide variety of applications and is able to discern complicated patterns such as a human face, or an individual's face in a crowd. Office application 121 further comprises a library 820 of geographic feature files (e.g., 821 and 822) which is accessed by optical recognition component 810. In one embodiment, the geographic feature files in library 820 are FXL compliant files having data and commands which permit optical recognition component 810 to extract feature attributes from image file 136 such as a picture or video clip. For example, geographic feature file 821 may comprise data and commands for extracting attributes from an image of a fire hydrant. Geographic feature file 821 lists the attributes which are to be collected from an image of the fire hydrant as well as the optical characteristics of those attributes which permit optical recognition component 810 to extract those features from a captured image of the fire hydrant.

In one embodiment, when geographic data file 130 is transferred to computer system 120, office application 121 can use optical recognition component 810 to automatically extract attributes of a feature by accessing image file 136. In one embodiment, office application 121 receives an indication of the feature type which has been collected and accesses the appropriate geographic feature file (e.g., 821) from library 820. Using the appropriate geographic feature file, optical recognition component 810 can access the picture or video of the geographic feature from image file 136 and extract attribute information about that geographic feature based upon the data stored in geographic feature file 821. In one embodiment, the extracted attribute information is then stored as description 831 of geographic feature 113 and/or attributes thereof. In one embodiment, office application 121 automatically accesses the configuration file 112 corresponding to geographic feature 113, or attribute thereof, and accesses the visual display property (e.g., 114) which is defined in description 831. Office application then generates displayed feature 124 in accordance with the visual display property 114. Office application 121 also automatically appends the extracted attribute information based upon the processing performed by optical recognition component 810 and displays the extracted attribute information in display 123.

In one embodiment, a voice recognition component (e.g., 830 of FIG. 8) can access audio file 137 of geographic data file 130. Voice recognition component 830 then converts the audio file into a corresponding description 831 of geographic feature 113 and/or attributes thereof. In one embodiment, description 831 comprises a textual description of geographic feature 113. In one embodiment, description 831 is compliant with the FXL format. It is noted that description 831 is required to be stored as a file. For example, in one embodiment description 831 may be stored in a volatile memory device (e.g., 303) rather than a persistently stored description. In one embodiment, office application 121 automatically accesses the visual display property 114 corresponding to geographic feature 113, or attribute thereof, which is defined in description 831. Office application then generates displayed feature 124 in accordance with the visual display property 114 and displays the attribute information derived by voice recognition component 830 in display 123.

It is noted that one embodiment of the present invention may access a plurality of media files to extract attribute data of a geographic feature. For example, office application 121 may access image file 136 and audio file 137 of geographic data file 130 to extract attribute data about geographic feature 113. In so doing, office application 121 can develop description 831 which is more detailed and conveys more information than may be possible using only one media file type. For example, depending upon lighting conditions, image file 136 may not fully convey the attributes, or condition, of a geographic feature. Thus, if geographic feature 113 is badly rusted, an image of geographic feature 113 may not convey that information if geographic feature 113 is in a shadow when an image is captured. In one embodiment, a user of geographic data collector 110 can use audio capture device 250 to create a verbal description of geographic feature 113 which is stored as audio file 137. In so doing, the user of geographic data collector 110 can verbally describe that geographic feature 113 is badly rusted and in need of servicing. In other words, office application 121 can access a plurality of media files to extract attribute data which may not be conveyed using only one media file type alone.

Figure 9:
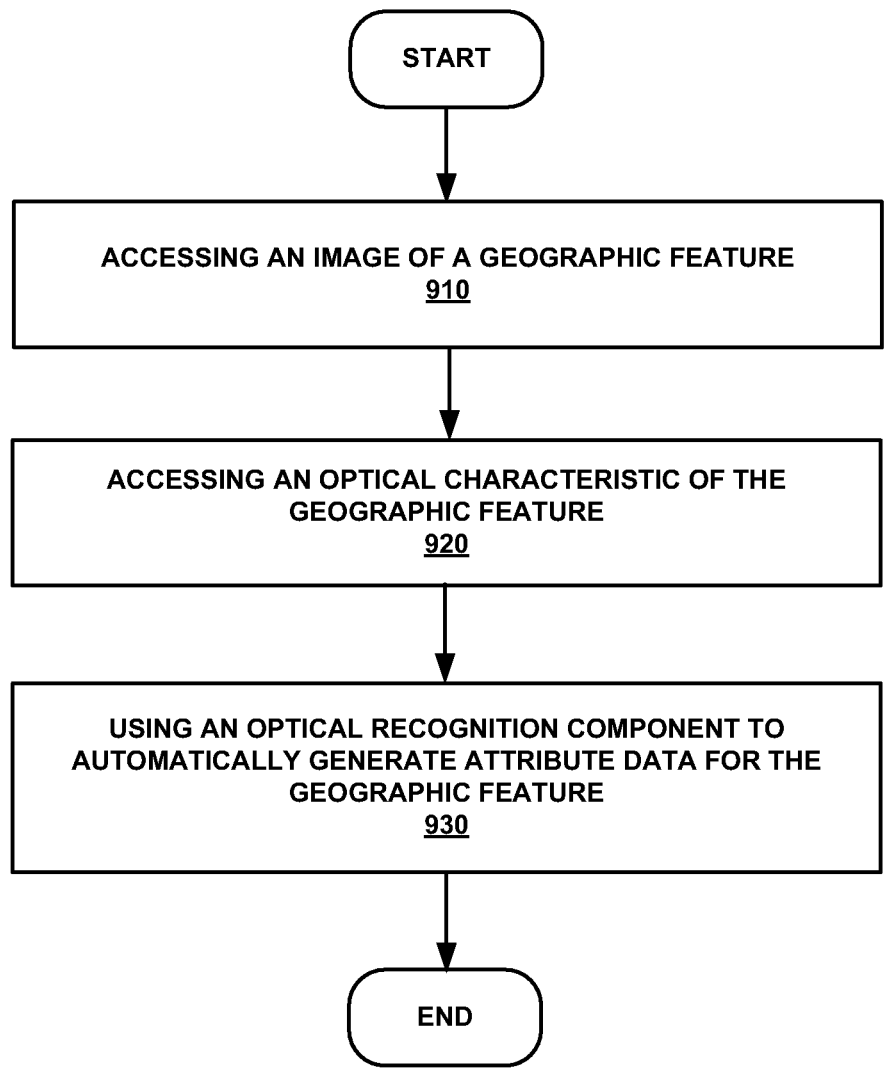
FIG. 9 is a flowchart of a method for extracting attribute data based upon a captured image in accordance with one embodiment.

FIG. 9 is a flowchart of a method 900 for extracting attribute data based upon a captured image in accordance with one embodiment. In operation 910 of FIG. 9, an image of a geographic feature is accessed. As described above, optical recognition component 810 of office application 121 accesses an image file 136 of a geographic feature from geographic data file 130. As discussed above, image file 136 may comprise one, or more pictures of a geographic feature, or may comprise a video clip of the geographic feature.

In operation 920 of FIG. 9, an optical characteristic of the geographic feature is accessed. In one embodiment, office application 121 receives an indication as to what feature type has been collected. For example, an operator can enter that geographic feature 113 comprises a fire hydrant. Optical characteristic component 810 then accesses the geographic feature file which corresponds to that feature type. As described above, the geographic feature file comprises data and commands for extracting attributes from an image as well as optical characteristics of those attributes.

In operation 930 of FIG. 9, an optical recognition component is used to automatically generate attribute data for the geographic feature. Based upon the characteristics in the geographic feature file, optical recognition component 810 can automatically generate attribute information about the geographic feature.

Figure 10:
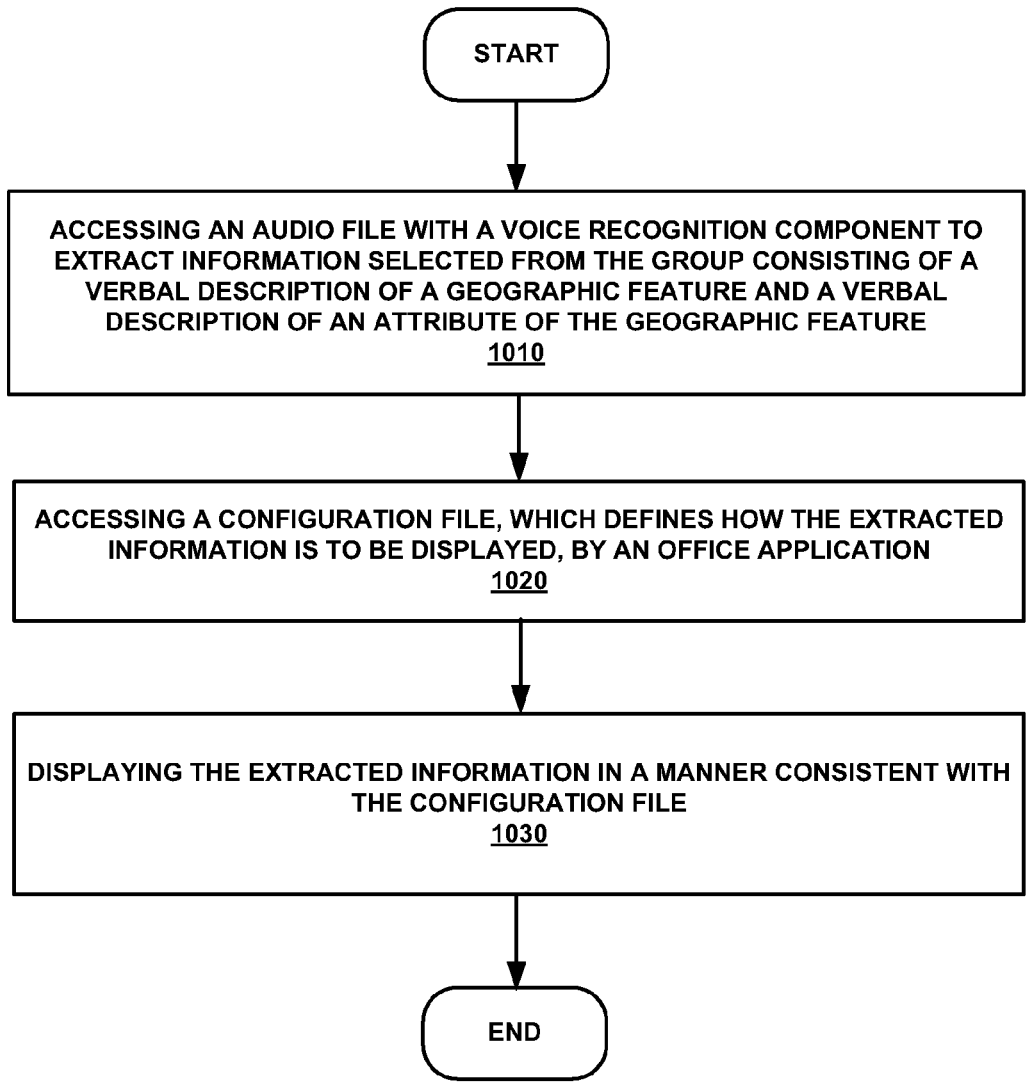
FIG. 10 is a flowchart of a method for extracting attribute data based upon an audio file in accordance with one embodiment of the present invention.

FIG. 10 is a flowchart of a method 1000 for extracting attribute data based upon an audio file in accordance with one embodiment of the present invention. In operation 1010, a voice recognition component accesses an audio file to extract information selected from the group consisting of a verbal description of a geographic feature and a verbal description of an attribute of the geographic feature. As described above, in one embodiment voice recognition component 830 automatically accesses audio file 137 when office application 121 accesses geographic data file 130. In one embodiment, audio file 137 comprises a verbal description of a geographic feature and/or an attribute thereof. In one embodiment, the information stored in audio file 137 is in addition to the geographic position, or other data, of geographic feature 113.

In operation 1020 of FIG. 10, a configuration file, which defines how said extracted information is to be displayed, is automatically accessed by an office application. In one embodiment, upon extracting the information, such as geographic feature information and/or attribute information about the geographic feature, office application 121 automatically accesses configuration file 112 which corresponds to geographic feature 113. For example, if office application 121 identifies the phrase "fire hydrant" in description 831, office application 121 will automatically access a configuration file (e.g., 121) which defines how a fire hydrant is to be displayed (e.g., displayed feature 124). Office application 121 then determines how geographic feature 113, or an attribute thereof, is to be displayed on display 123. Thus, based upon the extracted information from operation 1010 above, office application 121 uses visual display property 114 to define how the extracted information is to be displayed.

In operation 1030 of FIG. 10, the geographic feature is automatically displayed in a manner consistent with the configuration file. In one embodiment, upon determining how the extracted information is to be displayed, office application 121 generates displayed feature 124 which comprises the geographic feature and/or an attribute thereof. In one embodiment the extracted information about a geographic feature and/or its attributes is conveyed based upon the visual display properties (e.g., 114) associated with the geographic feature and/or attribute.

FIG. 11 is a flowchart of a method 1100 for extracting attribute data from at least one media file in accordance with an embodiment of the present invention. In operation 1110, an attribute of a geographic feature which is described in at least one media file is automatically identified. For the purpose of the present invention, the term "media file" describes a digital file comprising audio data, visual data such as a still photograph, or video footage (e.g., a movie, or the like), or a combination thereof. In one embodiment, a user of geographic data collector 110 can take a picture, or video footage, or a geographic feature. In another embodiment, a user of geographic data collector 110 can capture audio information about a geographic feature. In one embodiment, the audio information comprises a verbal description of the geographic feature, or an attribute thereof. One embodiment of the present invention utilizes at least one media file to retain information about a geographic feature. As described above, one embodiment accesses a plurality of media files such as image file 136 and audio file 137 to extract attributes of geographic feature 113. In one embodiment, office application 121 identifies one attribute of geographic feature 113 from a first media file (e.g., image file 136) and identifies a second attribute of geographic feature 113 from a second media file (e.g., audio file 137). In contrast, conventional geographic data collectors typically retain information about a geographic feature using a text based format. As described above, entering text based information into a conventional geographic data collector can be time consuming and prone to error for many users. In contrast, capturing information about a geographic feature using audio, video, or still images can be performed more quickly, and with less likelihood of error, for many users.

In operation 1120, a configuration file, which defines how said extracted information is to be displayed, is automatically accessed by the office application. In one embodiment, office application 121 accesses a geographic feature file in library 820 comprising data and commands which permit optical recognition component 810 to extract feature attributes from an image file (e.g., 136). In one embodiment, geographic feature file 821 lists the attributes which are to be collected from an image as well as the optical characteristics of those attributes which permit optical recognition component 810 to extract those features from a captured image or video footage. In one embodiment, the attribute information extracted by optical recognition component 810 is then stored as description 831 of geographic feature 113 and/or attributes thereof. In one embodiment, office application 121 automatically accesses the configuration file 112 corresponding to geographic feature 113, or attribute thereof, and accesses the visual display property (e.g., 114) which is defined in description 831.

In one embodiment, voice recognition component 830 access audio file 137 of geographic data file 130. Voice recognition component 830 then converts the audio file into a corresponding description 831 of geographic feature 113 and/or attributes thereof. In one embodiment, office application 121 automatically accesses the configuration file 112 corresponding to geographic feature 113, or attribute thereof, and accesses the visual display property (e.g., 114) which is defined in description 831. In one embodiment, office application 121 uses both voice recognition component 830 and optical recognition component 810 to extract attribute information about geographic feature 113 which is stored in description 831.

In operation 1130, the attribute of the geographic feature is automatically displayed in a manner consistent with the configuration file. The geographic feature is automatically displayed (e.g., 124) in a manner consistent with configuration file 112. In one embodiment, upon determining how the extracted information is to be displayed using visual display property 114, office application 121 generates displayed feature 124 which comprises the geographic feature and/or an attribute thereof based upon the visual display parameters defined in visual display property 114. As an example, displayed feature 124 can visually represent geographic feature 113 as defined by visual display property 114. Additionally, the representation of attributes of geographic feature 113, which were extracted from the media file, are also automatically represented in display 123.

Embodiments of the present invention, a method for collaborative display of geographic data, are thus described. While the present invention has been described in particular embodiments, it should be appreciated that the present invention should not be construed as limited by such embodiments, but rather construed according to the following claims.

What is claimed is:

1. A method for collaborative display of geographic data, said method comprising:
   creating a configuration file, at a computer system, which defines how geographic data collected by a geographic data collection device is represented by at least one visual display property that is associated with a geographic feature and how said geographic data is to be displayed by an office application associated with said computer system after a creation of a geographic data file;

conveying said configuration file to said geographic data collection device wherein said geographic data collection device is physically remote from said computer system;

using said configuration file to create a geographic data file, at said geographic data collection device, in which said geographic data collected by said geographic data collection device pertains: to a geographic feature, is associated with said at least one visual display property via said configuration file, and is formatted via said at least one visual display property to visually convey information about said geographic feature; and said office application accessing said geographic data file and automatically displaying said geographic feature at said computer system in a manner consistent with said configuration file.

2. The method as recited in claim 1 wherein said creating said geographic data file further comprises:
creating said geographic data file which is compliant with the Feature XML-based Languages (FXL) format.

3. The method as recited in claim 1 wherein said creating said configuration file further comprises:
receiving an indication of a desired visual display property which is associated with said geographic feature.

4. The method as recited in claim 3 further comprising:
appending metadata to a description of said geographic feature within said geographic data file which corresponds to said desired visual display property.

5. The method as recited in claim 4 further comprising:
said office application using said metadata to display said geographic feature based upon said desired visual display property.

6. A tangible computer-usable storage medium comprising instructions stored thereon wherein the instructions when executed cause a computer system to perform a method for collaborative display of geographic data, said method comprising:
generating a configuration interface at a computer system;
using said configuration interface to select at least one geographic feature at said computer system;
using said configuration interface to select at least one desired visual display property to associate with said geographic feature at said computer system;
storing said geographic feature and said at least one desired visual display property in a configuration file accessible by a geographic data collection device located physically remote from said computer system; and
receiving a geographic data file at said computer system, said geographic data file created by said geographic data collection device using said configuration file such that geographic data collected by said geographic data collection device pertains to said geographic feature and is visually represented in said geographic data file by said at least one desired visual display property.

7. The tangible computer-usable storage medium of claim 6 further comprising:
using said configuration file to cause said geographic data collection device to create a geographic data file which is compliant with the Feature XML-based Languages (FXL) format.

8. The tangible computer-usable storage medium of claim 6 wherein said creating said configuration file further comprises:
using said configuration file to cause said geographic data collection device to append metadata to said geographic feature within said geographic data file which corresponds to said desired visual display property.

9. The tangible computer-usable storage medium of claim 8 wherein said method further comprises:
an office application using said metadata to display said geographic feature based upon said desired visual display property.

10. The tangible computer-usable storage medium of claim 9 wherein said method further comprises:
automatically displaying said geographic feature wherein said at least one desired visual display property is used to determine how said geographic feature is displayed.

11. A geographic data collector comprising:
a geographic position determining component at said geographic data collector;
a feature library comprising at least one geographic feature at said geographic data collector;
a configuration file generated by a computer system with an office application and conveyed to said geographic data collector, wherein said configuration file associates a geographic feature with at least one visual display property, and wherein said computer system is located physically remote from said geographic data collector; and
a geographic data collection application at said geographic data collector for creating a geographic data file in which collected geographic data pertains to said geographic feature and is formatted, based on said configuration file, to permit said office application at said computer system to visually convey an attribute of said geographic feature based on said at least one visual display property.

12. The geographic data collector of claim 11 wherein said configuration file describes how said geographic feature is to be visually displayed by said office application.

13. The geographic data collector of claim 12 wherein said geographic data file is compliant with the Feature XML-based Languages (FXL) format.

14. The geographic data collector of claim 12 wherein said configuration file is further for causing said geographic data collection application to create a geographic data file which is formatted such that said office application visually displays said attribute automatically.

15. The geographic data collector of claim 12 wherein said configuration file is further for causing said geographic data collection application to append metadata to said geographic feature based upon a desired visual display property.

16. A geographic data display system comprising:
a bus;
a memory communicatively coupled with said bus; and
a processor communicatively coupled with said bus, said processor for executing a method for collaborative display of geographic data, said method comprising:
generating a configuration interface via said processor;
using said configuration interface to select a geographic feature via said processor;
using said configuration interface to select at least one desired visual display property to associate with said geographic feature via said processor;
storing said geographic feature and said at least one desired visual display property in a configuration file accessible by a geographic data collection device located physically remote from said processor; and receiving a geographic data file at said processor, said geographic data file created by said geographic data collection device using said configuration file such that geographic data collected by said geographic data collection device pertains to said geographic feature and is visually represented in said geographic data file by said at least one desired visual display property.

17. The geographic data display system of claim 16 wherein said method further comprises:

accessing data corresponding with said geographic feature from a geographic data file generated by said geographic data collection device; and automatically displaying said geographic feature wherein said at least one desired visual display property is used to determine how said geographic feature is displayed.

18. The geographic data display system of claim 17 wherein said geographic data file is compliant with the Feature XML-based Languages (FXL) format.

19. The geographic data display system of claim 16 wherein said configuration file is further for causing said geographic data collection device to append metadata which describes said desired visual display property to a description of said geographic feature.

20. A system for collaborative display of geographic data, said system comprising:

a geographic data collector;

an office application associated with a computer system which is located physically remote from said geographic data collector, said office application for generating a configuration file for said geographic data collector wherein a geographic feature is associated with a corresponding visual display property; and said geographic data collector comprising a geographic data collection application for receiving said configuration file from said office application and creating a geographic data file based on said configuration file in which collected geographic data pertains to said geographic feature and is formatted to permit said office application to visually convey said geographic feature via said corresponding visual display property.

21. The system of claim 20 wherein said office application further comprises:

a configuration interface generator to select said geographic feature and to select said desired visual display property which is associated with said geographic feature.

22. The system of claim 21 wherein said configuration file is further for associating said visual display property with an attribute corresponding to said geographic feature.

23. The system of claim 20 wherein said configuration file is further for causing said geographic data collection application to append metadata which describes said desired visual display property to said geographic feature and which stores said geographic feature and said metadata in a geographic data file.

24. The system of claim 22 wherein said geographic data file is compliant with the Feature XML-based Languages (FXL) format.

25. The system of claim 23 wherein said office application is further for accessing said metadata and automatically displaying said geographic feature based upon said desired visual display property.

* * * * *